US008594329B2

(12) United States Patent
Vaikuntanathan et al.

(10) Patent No.: US 8,594,329 B2
(45) Date of Patent: Nov. 26, 2013

(54) NON-INTERACTIVE VERIFIABLE, DELEGATED COMPUTATION

(75) Inventors: Vinod Vaikuntanathan, Seattle, WA (US); Panagiotis Voulgaris, San Diego, CA (US)

(73) Assignee: Microsoft Corporation, Redmond, WA (US)

( * ) Notice: Subject to any disclaimer, the term of this patent is extended or adjusted under 35 U.S.C. 154(b) by 323 days.

(21) Appl. No.: 12/970,981

(22) Filed: Dec. 17, 2010

(65) Prior Publication Data

US 2012/0155641 A1 Jun. 21, 2012

(51) Int. Cl.
*H04K 1/00* (2006.01)
(52) U.S. Cl.
USPC .............. 380/255; 380/44; 380/283; 713/168
(58) Field of Classification Search
USPC .............................. 380/44, 255, 283; 713/168
See application file for complete search history.

(56) References Cited

U.S. PATENT DOCUMENTS

| 2003/0018608 A1 | 1/2003 | Rice et al. |
| 2010/0211781 A1 | 8/2010 | Auradkar et al. |

FOREIGN PATENT DOCUMENTS

| WO | 03009522 A1 | 1/2003 |
| WO | 2008147400 A1 | 12/2008 |

OTHER PUBLICATIONS

Sadeghi, et al., "Token-Based Cloud Computing! Secure Outsourcing of Data and Arbitrary Computations with Lower Latency", Retrieved at << http://www.trust.rub.de/media/trust/veroeffentlichungen/2010/05/26/SSW10.pdf >>, 2010, pp. 13.
Applebaum, et al., "From Secrecy to Soundness: Efficient Verification via Secure Computation", Retrieved at << http://www.wisdom.weizmann.ac.il/~bennyap/pubs/VC.pdf >>, 2010, pp. 12.
Wang, et al., "Secure and Practical Outsourcing of Linear Programming in Cloud Computing", Retrieved at << http://www.ece.iit.edu/~kren/Computation_Outsourcing_10.pdf >>,2010, pp. 9.
Park et al., "THEMIS: Towards Mutually Verifiable Billing Transactions in the Cloud Computing Environment", Retrieved at << http://ieeexplore.ieee.org/stamp/stamp.jsp?tp=&arnumber=5557999 >>, 3rd International Conference on Cloud Computing, 2010, pp. 139-. 147.
Papamanthou, et al., "Optimal Authentication of Operations on Dynamic Sets", Retrieved at << http://eprint.iacr.org/2010/455.pdf >>, Aug. 23, 2010, pp. 23.

(Continued)

*Primary Examiner* — Edward Zee
*Assistant Examiner* — Baotran N To
(74) *Attorney, Agent, or Firm* — Kelly, Holt & Christenson (57) ABSTRACT

A processor on a delegator receives an input upon which an expensive function is to be evaluated. The delegator incorporates the input into a request to perform a task that is different from evaluating the function. When the task is performed, it provides a secondary result that is observable by the delegator. The secondary result is different from an answer to the expensive function and can be verified by the delegator with less computational expense than evaluation of the expensive function. The task can be performed by the server only after the server has verifiably evaluated the function based on the input. Request data, that is indicative of the request to perform a task with the input incorporated therein is transmitted to the server for performance of the task. The delegator then receives a returned result from the server indicative of the server performing the task. The returned result has a value that reflects both an answer to which the server has evaluated the function, and whether the answer is verified as being correct.

13 Claims, 10 Drawing Sheets

(56) References Cited

OTHER PUBLICATIONS

Goyal, et al., "Attribute-Based Encryption for Fine-Grained Access Control of Encrypted Data", Retrieved at << http://caislab.kaist.ac.kr/lecture/2010/spring/cs548/basic/B03.pdf >>, Oct. 30-Nov. 3, 2006, pp. 89-98.

Lewko, et al., "Fully Secure Functional Encryption: Attribute-Based Encryption and (Hierarchical) Inner Product Encryption", Retrieved at << http://eprint.iacr.org/2010/110.pdf >>, 2010, pp. 56.

Micali, Silvio, "Computationally Sound Proofs", Retrieved at << http://people.csail.mit.edu/silvio/Selected%20Scientific%20Papers/Proof%20Systems/Computationally_Sound_Proofs.pdf >>, vol. 30, No. 4, pp. 1253-1298.

Chung, et al., "Improved Delegation of Computation using Fully Homomorphic Encryption", Retrieved at << http://eprint.iacr.org/2010/241.pdf >>, Aug. 29, 2010, pp. 27.

Gennaro, et al., "Non-interactive Verifiable Computating: Outsourcing Computation to Untrusted Workers", Retrieved at << http://128.2.134.25/group/pub/gennaro_gentry_parno_verifiable.pdf >>, May 27, 2010, pp. 19.

NON-INTERACTIVE VERIFIABLE, DELEGATED COMPUTATION

BACKGROUND

In some current computing environments, some users require computations to be performed that are very computationally expensive in that they require a great deal of time or computational resources, or both. However, it is often the case that such users do not have, at their disposal, sufficient computational resources to perform the expensive computations in any sort of efficient manner. Therefore, such computations are sometimes outsourced, or delegated, to a more powerful resource, such as a server. Thus, for instance, when the user receives an input that requires the expensive computation, the user sends the input off (or delegates it) to the server for performance of the expensive computation on the input. The server then returns the result to the user (or delegator).

However, there can be incentives for the server to perform a calculation in a way that is less costly, but often less accurate, than otherwise. Therefore, it can be beneficial for the delegator to be able to verify the answer returned by the server.

One way to address this problem is to simply have the delegator repeat the expensive calculation to verify the answer returned by the server. This, however, is highly inefficient in that the delegator must perform the expensive computation which has been outsourced. Alternatively, the delegator can verify only some of the results returned by the server. This also has drawbacks because the more results that are verified, the lower the efficiency of the overall computation.

Other ways of verifying an outsourced computation often involve a highly interactive verification process. That is, there are a relatively large number of interactions between the delegator and the server, in order to verify that the computation is indeed correct.

Other problems exist with outsourcing computations as well. Some systems allow the server to observe whether the delegator accepts or rejects the result returned by the server. With many iterations, the server can slowly learn the techniques used for verification by the delegator, and can then, eventually, mislead the user into accepting an incorrect answer.

Also, in many current systems, the server returns the result of the expensive computation, and the delegator must then perform a separate operation to verify the accuracy of the result. That is, the performance of the expensive computation, and the verification of the result of that computation, are two separate processes, often requiring two separate components.

Data encryption has been employed using a public and private key architecture. In such an architecture, a public key is generated and published, and a private or secret key is also generated and secretly shared with those entities that are allowed to decrypt data. When data is encrypted, it is encrypted using the public key and the only entity that can decrypt the data is one who has the private key.

Attribute based encryption is a type of encryption that is commonly employed in an environment where a message is encrypted, but the entity that encrypts the message does not necessarily know who will be accessing the data. In general, the data can be encrypted to any predefined set of attributes. The data is encrypted to a set of attributes, and the entity that is decrypting the data has a secret key that is associated with a predefined access policy. If the decryption entity has a secret key associated with an access policy, and the set of attributes that the data is encrypted under satisfies the access policy, then and only then can the decrypting entity successfully decrypt the data.

A type of attribute-based encryption, referred to as "key policy attribute-based encryption" (KP-ABE), is a type of attribute-based encryption wherein each user's private key has an associated access structure which specifies the type of ciphertext the private key can successfully decrypt. If the user's access structure is satisfied by the set of attributes that the ciphertext is encrypted under, then the user can decrypt the ciphertext. Otherwise, the secret key corresponding to the access structure is useless to the decryption entity.

The discussion above is merely provided for general background information and is not intended to be used as an aid in determining the scope of the claimed subject matter.

SUMMARY

A processor on a delegator receives an input upon which an expensive function is to be evaluated. The delegator incorporates the input into a request to perform a task that is different from evaluating the function. When the task is performed, it provides a secondary result that is observable by the delegator. The secondary result is different from an answer to the expensive function and can be verified by the delegator with less computational expense than evaluation of the expensive function. The task can be performed by the server only after the server has verifiably evaluated the function based on the input. Request data, that is indicative of the request to perform a task with the input incorporated therein is transmitted to the server for performance of the task. The delegator then receives a returned result from the server indicative of the server performing the task. The returned result has a value that reflects both an answer to which the server has evaluated the function, and whether the answer is verified as being correct.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
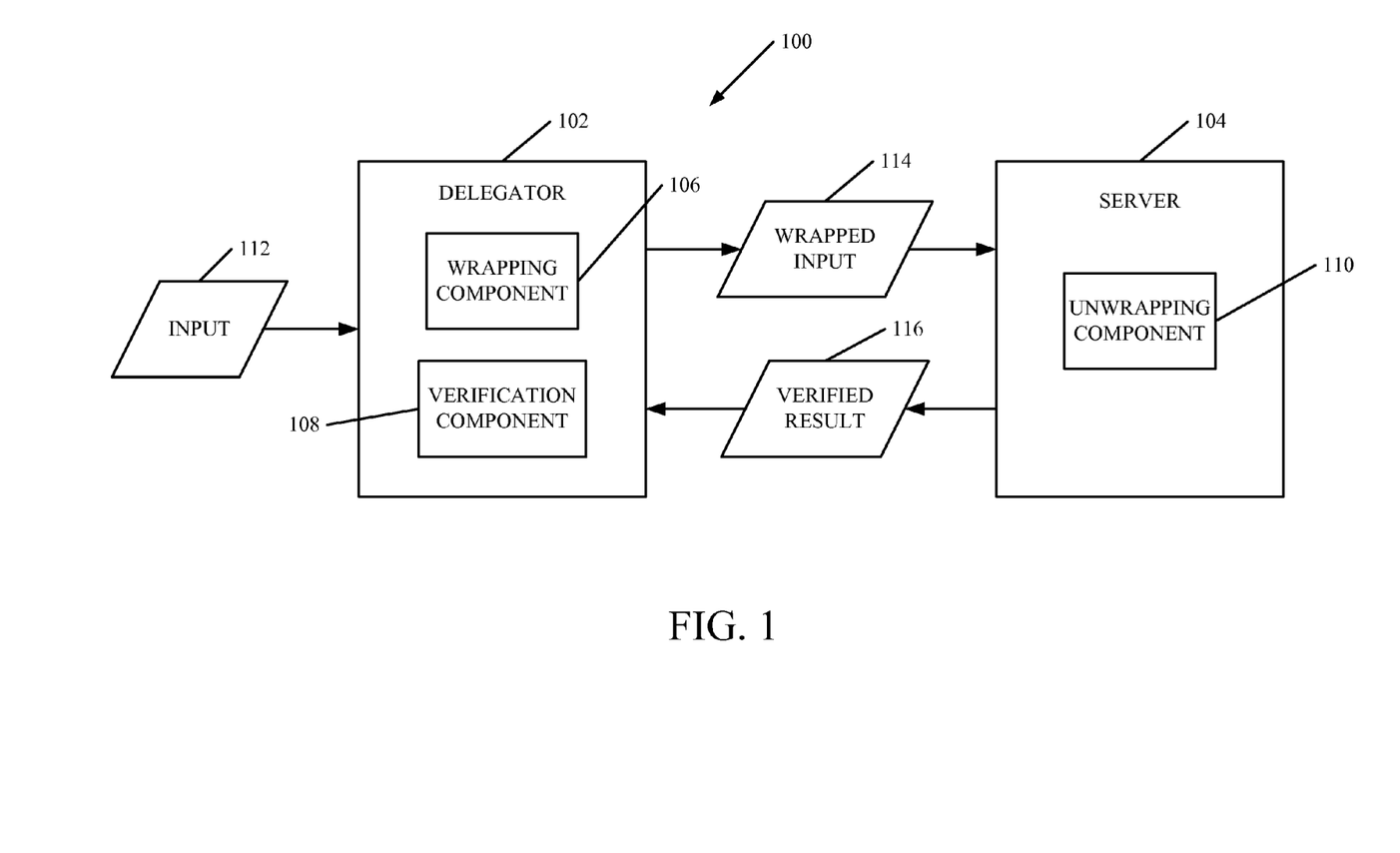
FIG. 1 is a block diagram of one system for outsourcing a computation in accordance with one embodiment.

FIG. 1 is a block diagram of an outsourcing architecture 100. Architecture 100 includes delegator 102 and server 104. Delegator 102, during its operation, illustratively desires the results of a very computationally expensive computation. For purposes of this discussion, computational expense means the amount of time or computing power or the amount of computational resources required to perform a computation, or all of the above. However, in one illustrative embodiment, delegator 102 does not have sufficient computational resources to perform the expensive computation. Alternatively, of course, even if delegator 102 has sufficient computational resources, delegator 102 simply may desire to outsource the computation to server 104.

In any case, FIG. 1 shows that delegator 102 receives an input 112 and has wrapping component 106 and verification component 108. Server 104 includes unwrapping component 110. In accordance with one embodiment, wrapping component 106 receives input 112 and wraps it in a secondary function or a secondary calculation and provides it, as wrapped input 114, to server 104. Unwrapping component 110 unwraps the wrapped input 114 by evaluating the expensive function based on input 112. Only after server 104 verifiably evaluates the expensive function based on the input 112 can server 104 perform the secondary calculation. Server 104 provides the result of the secondary calculation as verified result 116 to delegator 102. Verification component 108 verifies that verified result 116 is actually the correct result, and thereby verifies the computation performed by server 104. The architecture 100 is structured such that delegator 102 can verify the result of the secondary calculation much more easily than it can evaluate the expensive function. That is, the secondary calculation is less computationally expensive than the expensive function.

It can thus be seen in FIG. 1 that the value of verified result 116 not only communicates the result of the expensive computation on the input 112, but it also, simultaneously, conveys verification that the result is correct. This guarantee that the result is verified is built in to the result itself. This is described in greater detail below.

Figure 2:
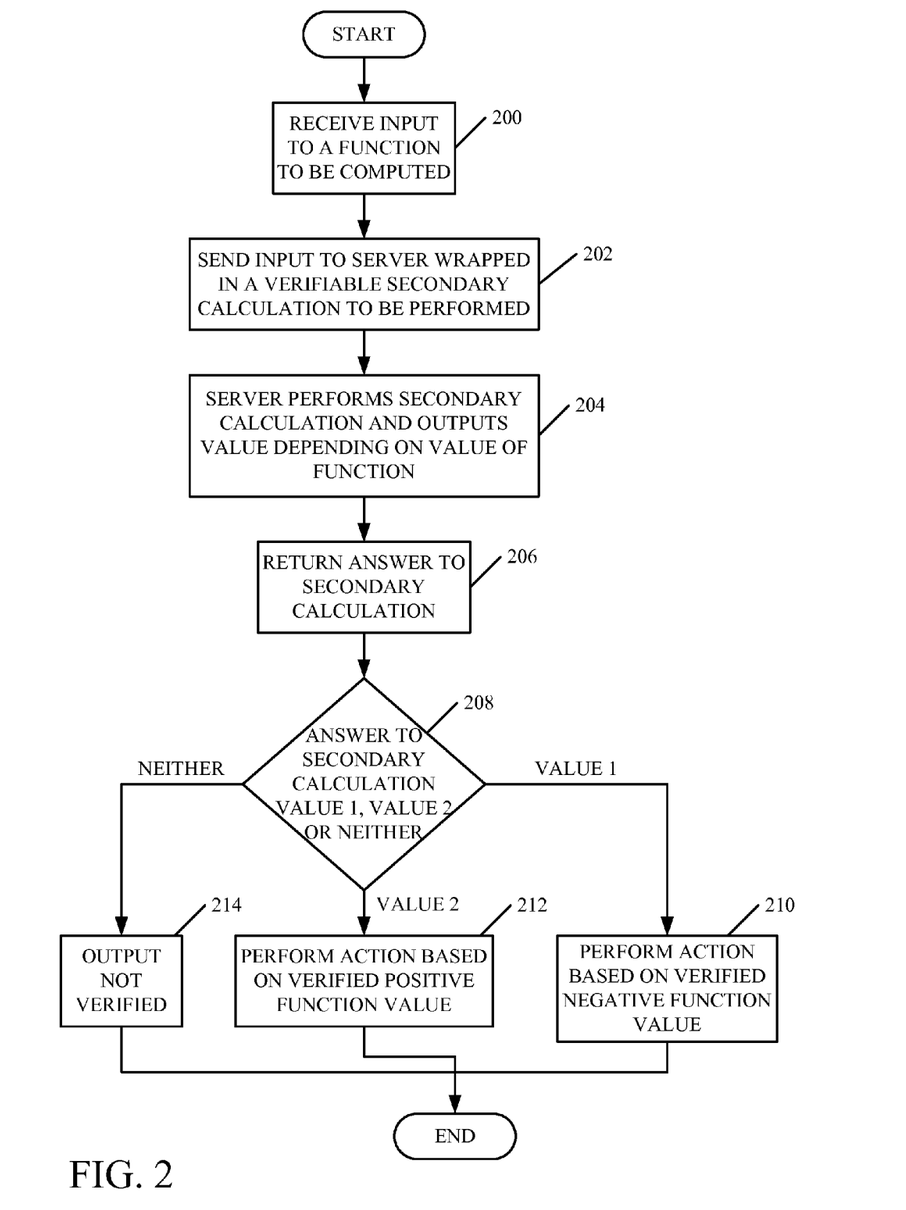
FIG. 2 is a flow diagram illustrating one embodiment of the operation of the system shown in FIG. 1.

FIG. 2 is a flow diagram illustrating one illustrative embodiment of the operation of architecture 100 shown in FIG. 1. In the embodiment discussed herein, the function outsourced by delegator 102 to server 104 is a Boolean function. That is, the function takes as an input a set S of n bits and outputs a 1 if a function evaluates to a positive on S and a 0 if the function evaluates to a negative on S. It will be noted, of course, that the function may require a very large number of complex computational steps to evaluate the function. Therefore, it may be a highly expensive function, but may still result in only a 1 or a 0 as an output.

In the embodiment described in FIGS. 1 and 2, delegator 102 first receives the input 112. The input 112 is illustratively S bits of input that are to be used in computing the outsourced function. Receiving the input is indicated by block 200 in FIG. 2. Wrapping component 106 then wraps the input 112 into a secondary calculation that is to be performed at the server 104. The secondary calculation performed by the server is different depending on whether the function performed by the server evaluates to a 1 or a 0. Sending the input 112 to server 104 wrapped in the verifiable secondary calculation, as wrapped input 114, is indicated by block 202 in FIG. 2. Server 104 then performs the secondary calculation.

As noted above, server 104 can only perform the secondary calculation if it verifiably evaluates the expensive function based on the input S, and the value of the secondary calculation changes depending upon whether the expensive function evaluates to a 0 or a 1. Performing the secondary calculation is indicated by block 204 in FIG. 2.

Server 104 then returns the answer to the secondary calculation as verified result 116. This is indicated by block 206 in FIG. 2. Delegator 102 then uses verification component 108 to examine the returned answer to the secondary calculation to determine whether it takes a first value, indicative of the expensive function evaluating to a 0, a second value indicative of the expensive function evaluating to a 1, or to neither the first nor second value, which indicates that the server 104 has not returned a verified result. Using the verification component 108 to make this determination is indicated by block 208 in FIG. 2.

Based on the determination made by verification component 108, delegator 102 either performs an action based on the verified negative function value, or the verified positive function value, or delegator 102 determines that the output from server 104 is not verified. These various options are illustrated by boxes 210, 212 and 214 in FIG. 2.

It can be seen from FIG. 1 that delegator 102 simply provides the wrapped input 114 to server 104 and then receives the verified result 116. Result 116 takes on a value that indicates the expensive function either evaluated to a 1 or a 0, or the result is unverified. Therefore, simply by looking at result 116, verification component 108 can determine the value of the expensive function (whether it evaluated to a 0 or a 1) and can also simultaneously determine whether that result is verified (because the value of the result can only be provided by server 104 if it is a verified value). Thus, FIGS. 1 and 2 describe a general, non-interactive approach for verifying an expensive function that is outsourced from delegator 102 to server 104.

FIGS. 3-6 now describe one illustrative embodiment of the system shown in FIGS. 1 and 2, in more detail. In the embodiments shown in FIGS. 3-6, an attribute-based encryption scheme that supports an access structure A can be used to verifiably delegate the computation of a related function $f_A$. Since attribute-based encryption can support very expressive access structures, the embodiment shown in FIGS. 3-6 provides a way to verifiably outsource the computation of a large class of functions.

Figure 3:
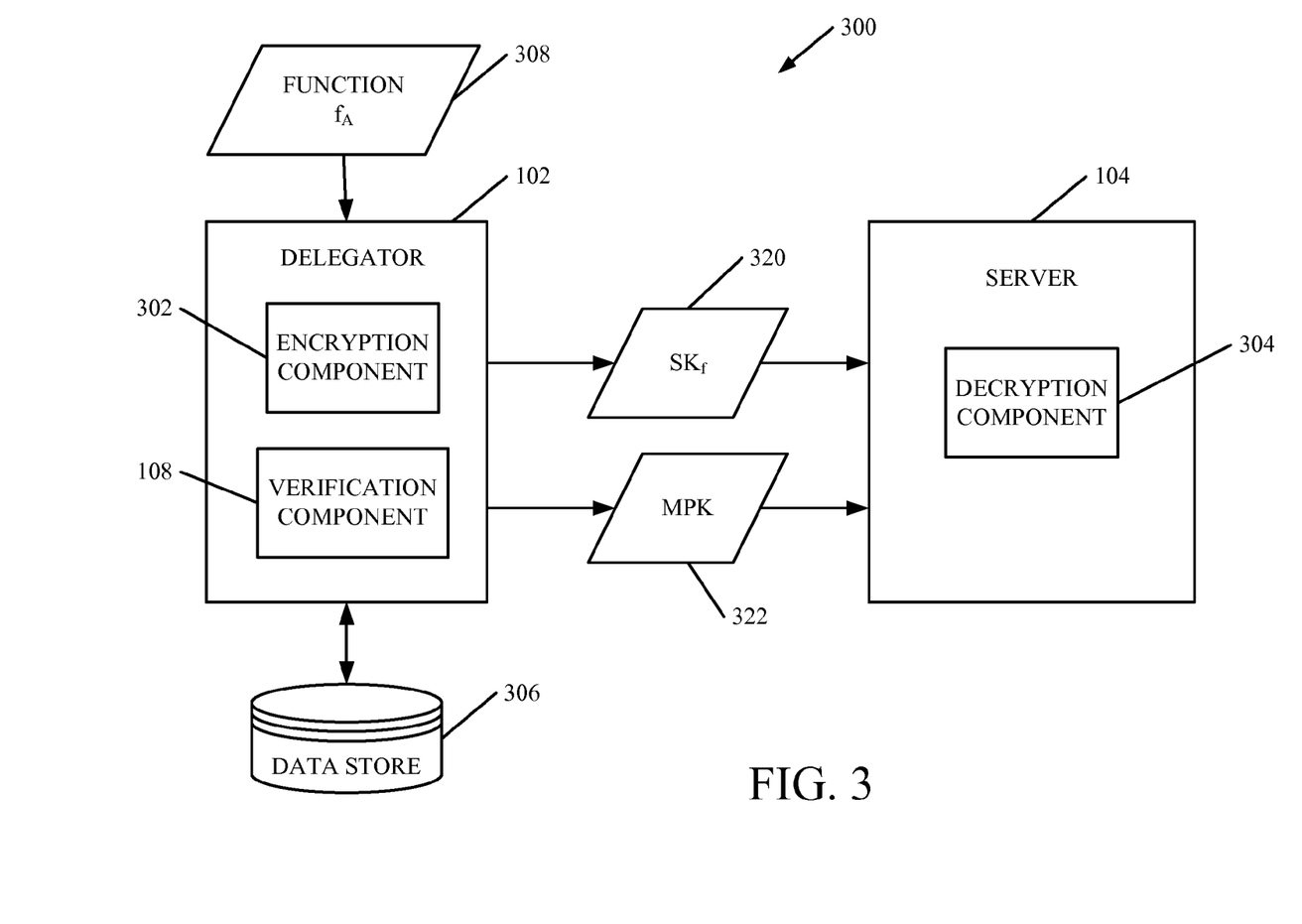
FIG. 3 is a block diagram illustrating one embodiment of a system for outsourcing a function using attribute-based encryption.

FIG. 3 shows a more specific embodiment of an architecture 300 for outsourcing the computation of an expensive function. Architecture 300 again includes delegator 102 and server 104. Similar items are similarly numbered to those shown in FIG. 1.

Delegator 102 also includes verification component 108. However, in the embodiment shown in FIG. 3, the wrapping component (106 from FIG. 1) is implemented as an attributed-based encryption component 302. Server 104 uses decryption component 304 to implement unwrapping component 110 (shown in FIG. 1). Architecture 300 also shows that delegator 102 has access to data store 306 and receives an input function f, 308, which is the expensive function that is being outsourced to server 104. In the embodiment discussed with respect to FIGS. 3-6, the function $f_A$, 308 takes as an input a set S of n bits and outputs 1 if S is in the access structure and 0 otherwise. That is, f is assumed to be any Boolean function that takes n bits to its {true, false} and gives rise to an access structure that includes all inputs that evaluate to true under f. By a mapping between n-bits and subsets {1, 2, ... n}, each such input gives rise to a subset of {1, 2, ... n}.

Delegator 102 first uses a key generation portion of encryption component 102 to generate a master secret key (MSK), a master public key (MPK) and a secret key ($SK_f$) for an attribute-based encryption scheme. The secret key $SK_f$ is computed and corresponds to the access structure A associated with f., under MPK and MSK. Computing MSK, MPK and $SK_f$ is indicated by blocks 350, 352 and 354 in FIG. 4.

Figure 4:
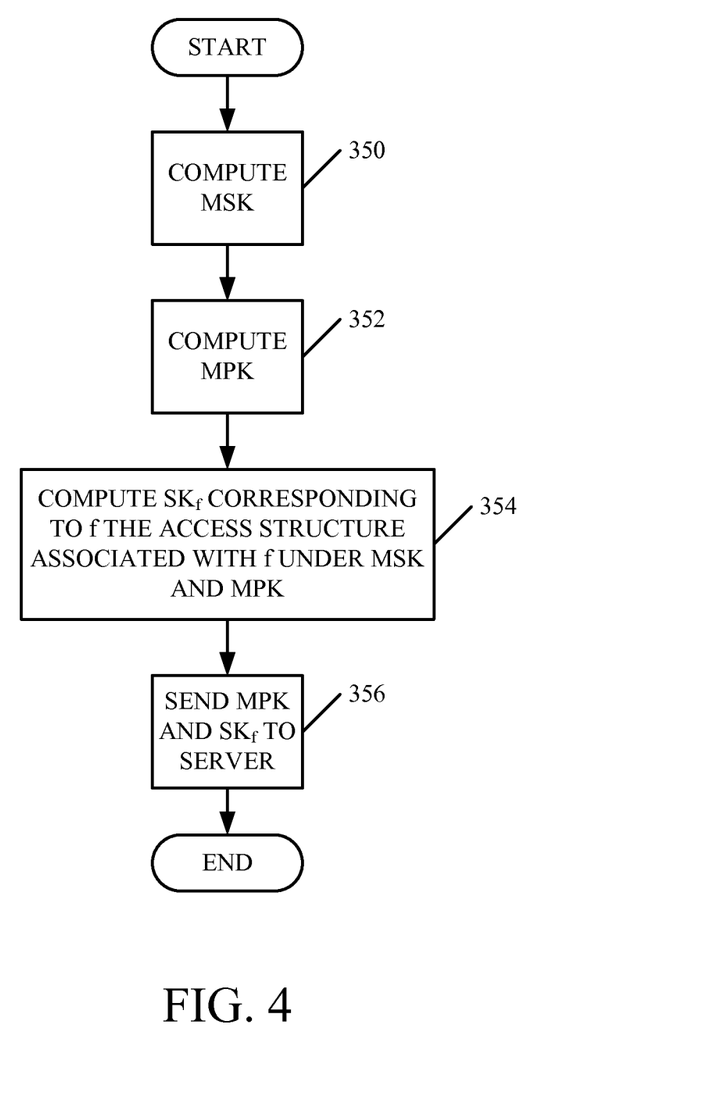
FIG. 4 is a flow diagram illustrating one embodiment of the operation of the system shown in FIG. 3 in transmitting a master public key and a secret key to a server.

Delegator 102 then sends secret key $SK_f$ and master public key MPK to server 104, as indicated by block 356 in FIG. 4. Secret key $SK_f$ is indicated by numeral 320 in FIG. 3 and master public key MPK is indicated by numeral 322 in FIG. 3.

Generating these keys is a relatively expensive pre-processing step. For instance, in one illustrative embodiment, assume that the function $f_A$ is a function which searches a large data store 306 for one or more key words. In performing the preprocessing step of generating the keys described with respect to FIG. 4, delegator 102 examines the entire data store 106 for various key words and generates values, such as search vectors, representative of searches performed for the key words. Those vectors are used in generating the keys described with respect to FIG. 4. While this is a relatively expensive processing step, because it runs through the entire data store 106, it only needs to be performed once in generating the keys. Then, delegator 102 can simply delegate the expensive function of examining data store 306 for one or more key words to server 104.

Figure 5:
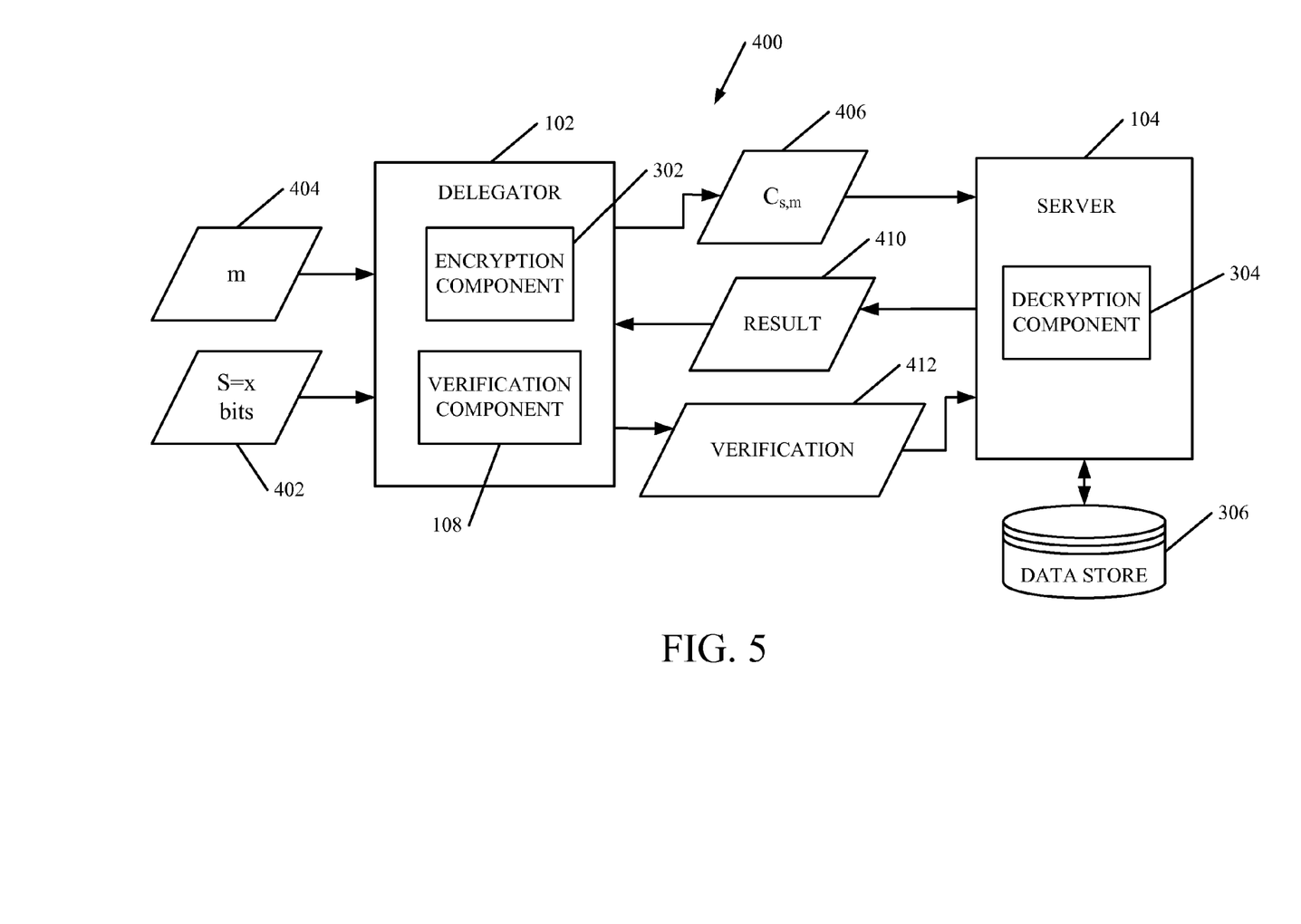
FIG. 5 is a block diagram of the system shown in FIG. 4, as used for performing verifiable computations.
Figure 6:
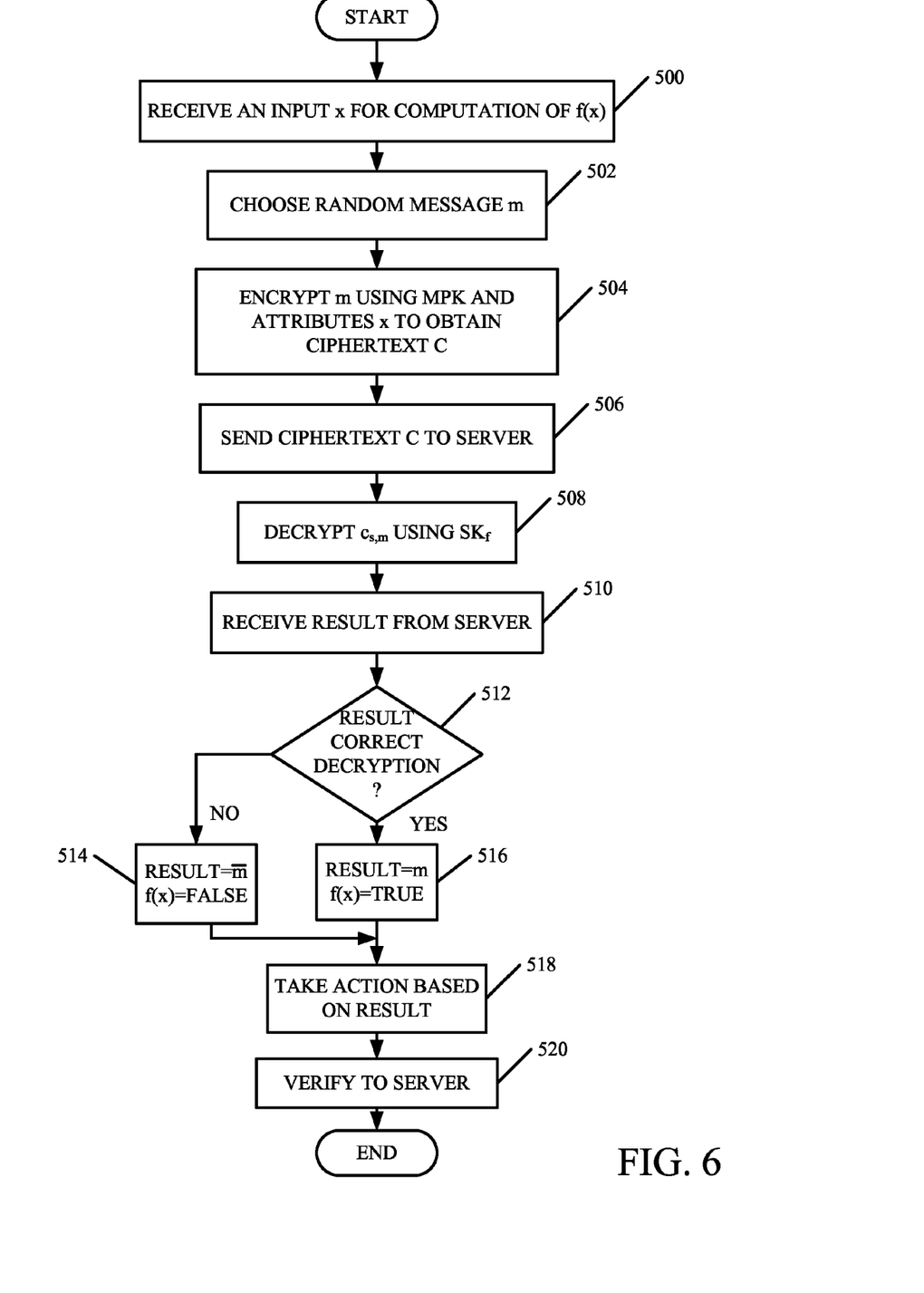
FIG. 6 is a flow diagram showing one embodiment of the operation of the system shown in FIG. 5.

FIG. 5 shows architecture 300 of FIG. 3 as used, in one illustrative embodiment, in the runtime phase during which the expensive function is evaluated at server 104. Similar items are similarly numbered to those shown in previous Figures. FIG. 6 is a flow diagram illustrating one embodiment of the operation of architecture 400, shown in FIG. 5, during runtime.

Delegator 102 first receives a set S of x bits for computation of the function f(x). The set of x bits is indicated by block 402 in FIG. 5 and receiving the input is indicated by block 500 in FIG. 6. Delegator 102 then chooses a random message m, 404. This is indicated by block 502 in FIG. 6. Encryption component 302 in delegator 102 then encrypts the message m using the master public key MPK, 322 and the x bits as attributes to obtain a ciphertext $c_{s,m}$. The ciphertext is indicated by block 406 in FIG. 5. Encrypting m using the x attributes to obtain the ciphertext is indicated by block 504 in FIG. 6.

Delegator 102 then sends $c_{s,m}$ 406 to server 104 as indicated by block 506 in FIG. 6. Decryption component 304 in server 104 then decrypts $c_{s,m}$, using $SK_f$ (which is the secret key tagged with the function f). In doing this, server 104 searches data store 306, and is only able to decrypt $c_{s,m}$ using the secret key $SK_f$ if the function f(x) evaluates to a 1 (or true). For instance, where the input x is a set of letters that define a key word and the function is to search data store 306 for that keyword, then decryption component 304 can only decrypt $c_{s,m}$ to obtain the decrypted message m if the function evaluates to a true, and if decryption component 304 has $SK_f$. Decrypting $c_{s,m}$, using $SK_f$ is indicated by block 508 in FIG. 6. Decryption component 304 of server 104 then returns result 410 to delegator 102. Receiving the result from server 104, at delegator 102, is indicated by block 510 in FIG. 6.

Verification component 108 then determines whether result 410 corresponds to the random message m, 404 or whether it does not correspond to that message. If result 410 corresponds to message m, 404, that means that f(x) evaluated to a true at server 104. However, if result 410 does not correspond to message m, 404, then decryption component 304 was unable to decrypt $c_{s,m}$ and that means that f(x) evaluated to a 0. Using verification component 108 to determine the result is indicated by blocks 512, 514 and 516 in FIG. 6.

Delegator 102 can then take action based upon the result. This is indicated by block 518 in FIG. 6. Optionally, delegator 102 can also send a verification 412 to server 104 indicating that it has received result 410 and found it to be a verified result or an unverified result. Sending the verification to the server is indicated by block 520 in FIG. 6.

It can thus be seen that FIGS. 5-6 illustrate a runtime operation in which delegator 102 simply needs to view result 410 to see whether it corresponds to the message m, 404 that was encrypted and sent to server 104. If the two are the same, that means that decryption component 304 in server 104 was able to decrypt $c_{s,m}$ to obtain m and thus the value of the expensive function evaluated to a 1 (or true). If the returned result 410 is not the same as the random message m, 404, then that means that decryption component 304 was not able to decrypt $c_{s,m}$ and thus the expensive function evaluated to a 0.

However, this leaves one way that server 104 can still cheat. For instance, if the value of the expensive function f(x) actually evaluates to a 1, the server can still cheat by returning result 410 that is different from message m, 404. In that case, delegator 102 has no way to verify that f(x) evaluated to a 0 (or false). That is, delegator 102 can only verify a true result, but cannot verify a false result.

Figure 7:
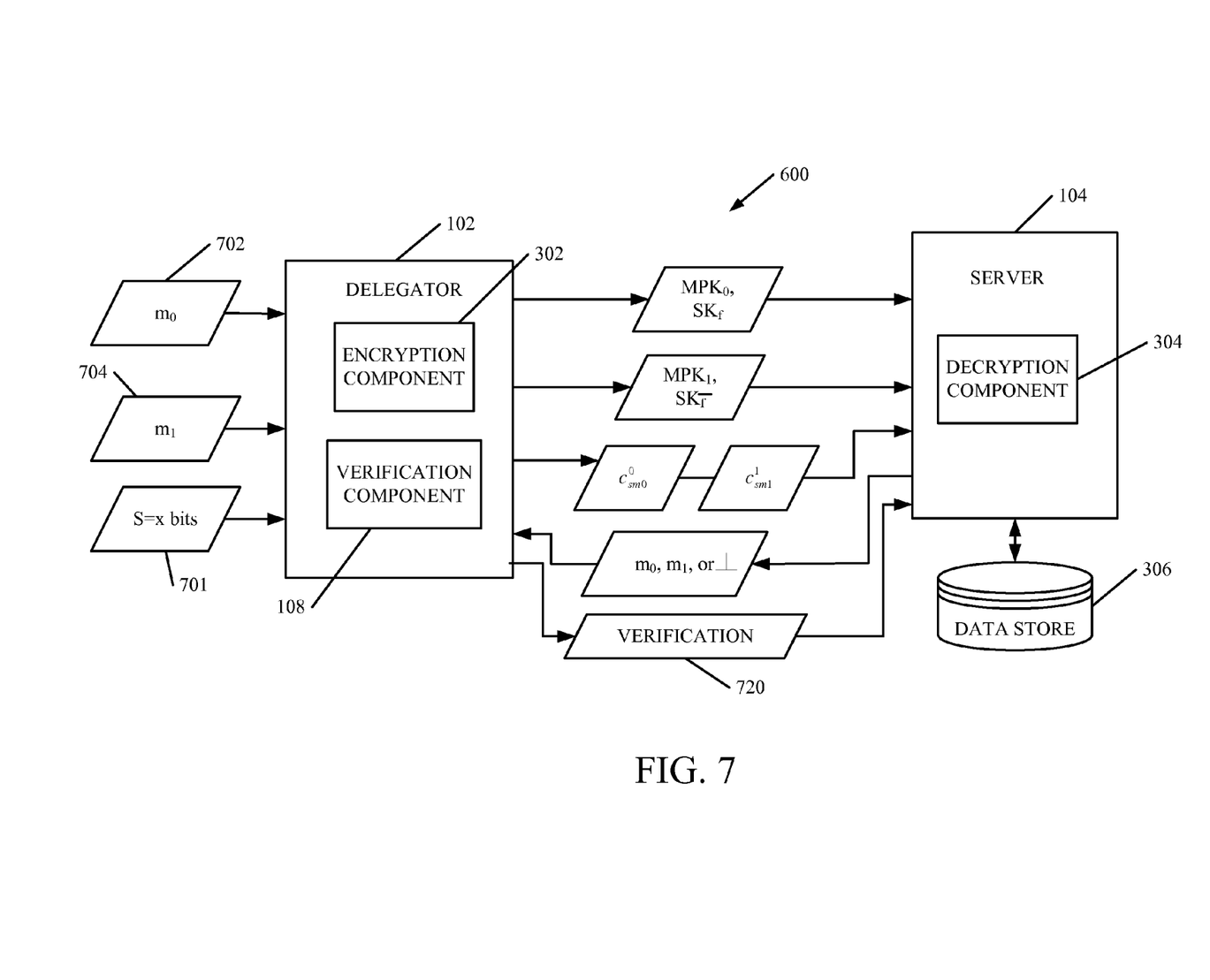
FIG. 7 is a block diagram illustrating other embodiment of a system using attributed-based encryption for performing non-interactive, verifiable computations.
Figure 8:
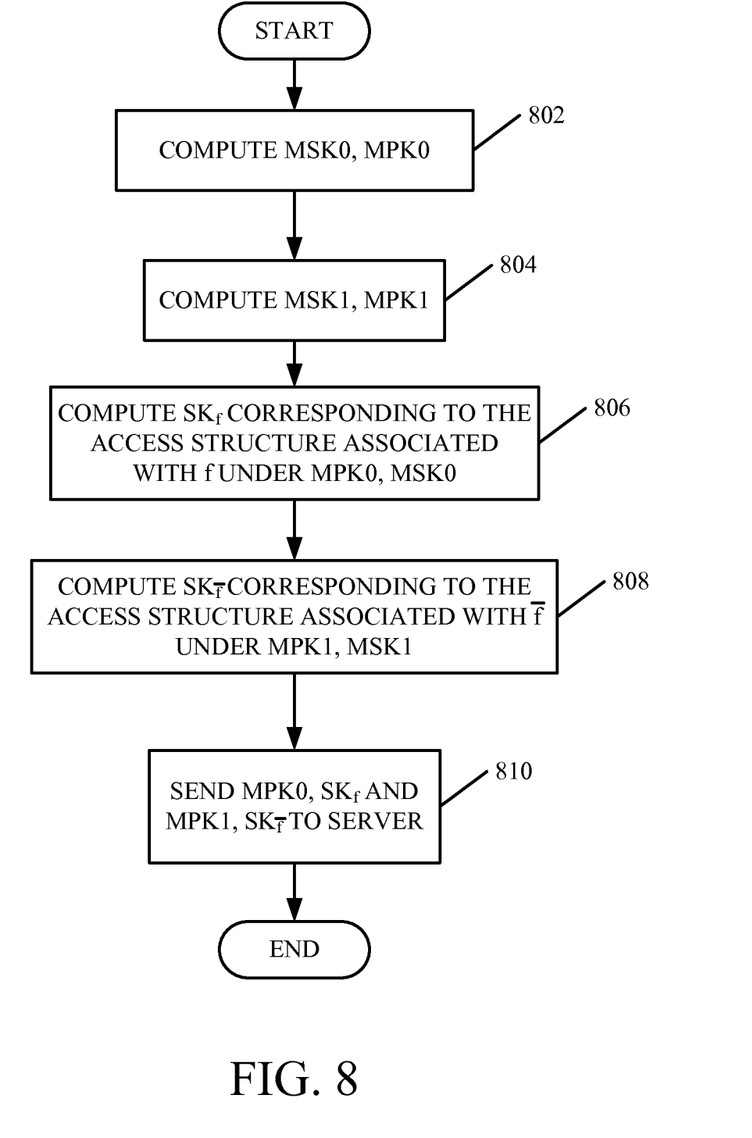
FIG. 8 is a flow diagram illustrating one embodiment of the system shown in FIG. 7 in generating and sending master public keys and secret keys to the server.
Figure 9:
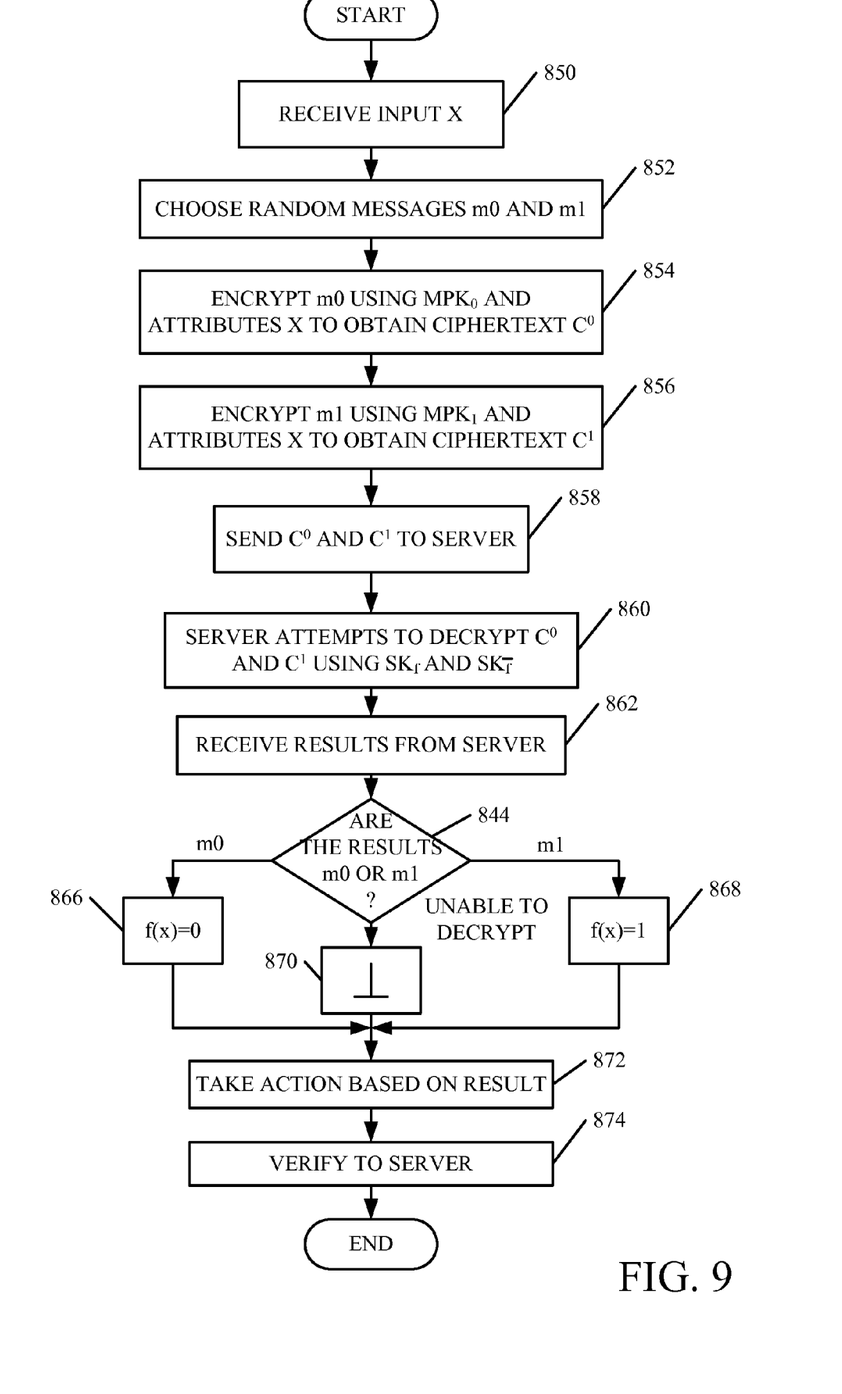
FIG. 9 is a flow diagram illustrating outsourcing of a computation using the keys generated in FIG. 8.

Therefore, FIGS. 7-9 show another embodiment that includes architecture 600, and its illustrative operation, so that, during the runtime phase, delegator 104 can actually verify both a true evaluation of the function and a false evaluation of the function. Architecture 600 has similar items that are similarly numbered to those shown in the previous Figures. Thus, FIG. 7 shows that delegator 102 has encryption component 302 and verification component 108, and server 104 has decryption component 304 and has access to data store 306.

FIG. 8 is a flow diagram illustrating one embodiment of the operation of architecture 600 in performing the expensive preprocessing phase during which keys are generated. In the preprocessing stage, a key generation component of encryption component 302 computes two master secret keys and two master public keys (MSK0, MPK0) and (MSK1, MPK1), respectively, for an attribute-based encryption scheme. This is indicated by blocks 802 and 804 in FIG. 8. The key generator portion of encryption component 302 also generates a secret key $SK_f$ corresponding to an access structure associated with f under MPK0, MSK0. This is indicated by block 806 in FIG. 8. Next, the key generation portion of encryption component 302 generates a second secret key $SK_{\bar{f}}$ corresponding to the access structure associated with the complement of the function f, under MPK1 MSK1. This is indicated by block 808 in FIG. 8. Delegator 102 then sends MPK0, $SK_f$ and MPK1, $SK_{\bar{f}}$ to server 104. This is indicated by block 810 in FIG. 8.

FIG. 9 is a flow diagram illustrating the operation of architecture 600 (shown in FIG. 7) during the runtime phase. Every time delegator 102 wishes to compute the function f on an input set S of x bits 701, delegator 102 first chooses two random messages $m_0$, 702 and $m_1$, 704. Receiving the input x bits and choosing the random messages, $m_0$ and $m_1$ is indicated by blocks 850 and 852 in FIG. 9.

Encryption component 302 then encrypts messages $m_0$ and $m_1$. Specifically, encryption component 302 encrypts $m_0$ using $MPK_0$ and attribute x, and encrypts $m_1$ using $MPK_1$ and attribute x. Encrypting $m_0$ provides ciphertext $c_{s,m_0}^0$. This is indicated by block 854 in FIG. 9. Encrypting message $m_1$ provides ciphertext $c_{s,m_1}^1$. This is indicated by block 856 in FIG. 9. Delegator 102 then sends ciphertexts $c_{s,m_0}^{\ 0}$ and $c_{s,m_1}^{\ 1}$ to server 104. This is indicated by block 858 in FIG. 9.

Decryption component 304 then attempts to decrypt $c_{s,m_0}^{\ 0}$ using $SK_f$ and $c_{s,m_1}^{\ 1}$ using $SK_{\bar{f}}$. This is indicated by block 860 in FIG. 9. Server 104 will only be able to decrypt one of the two ciphertexts using the appropriate secret key (either $SK_f$ or $SK_{\bar{f}}$) depending upon whether the expensive function f(x) evaluates to a 1 or a 0, respectively. Thus, if decryption component 304 decrypts $c_{s,m_0}^{\ 0}$ and returns $m_0$ then verification component 108 in delegator 102 knows that f(x) evaluated to a 0 and this is a verified result. It is verified because decryption component 304 would not be able to decrypt the ciphertext to obtain $m_0$ if it were not verified.

If server 104 returns the value $m_1$, then verification component 108 knows that f(x) evaluated to a 1, and this result is verified as well. The reason is that decryption component 304 would not be able to decrypt the ciphertext to obtain $m_1$ if the value of the function had not actually evaluated to a 1.

Similarly, if server 104 returns a different result (neither $m_0$ nor $m_1$) then verification component 108 knows that server 104 was not able to decrypt either of the ciphertexts, and thus the returned result is not a verified result. That is, it is not verified that the function evaluated to either a 1 or a 0. Receiving the results from server 104 and determining whether they correspond to $m_0$, $m_1$, or some other result, is indicated by blocks 862, 864, 866, 868 and 870 in FIG. 9.

Delegator 102 can then take desired action based upon the result of the expensive function being evaluated by server 104. This is indicated by block 872 in FIG. 9.

Delegator 102 can optionally send a verification 720 back to server 104 indicating that it has received the proper, verified, or unverified result. Verifying to server 104 is indicated by block 874 in FIG. 9. This is optional.

It can be seen from FIGS. 7-9, that delegator 102, simply by determining the value of the returned result ($m_0$, $m_1$, or something else) learns the correct value of f(x) and it can be mathematically proven that the server cannot cheat the user into accepting the wrong answer. Thus, as with the previous Figures, receiving the result from the server simultaneously gives the delegator the value of the result of evaluating the expensive function and an indication as to whether that result is verified.

Stated in other terms, delegator 102 receives an input and incorporates that input into a request to perform a task (such as to decrypt the ciphertext). The task is different from evaluating the expensive function, but the result of performing the task is observable by delegator 102 and conveys the answer to evaluating the expensive function as well as whether the answer is verified.

Figure 10:
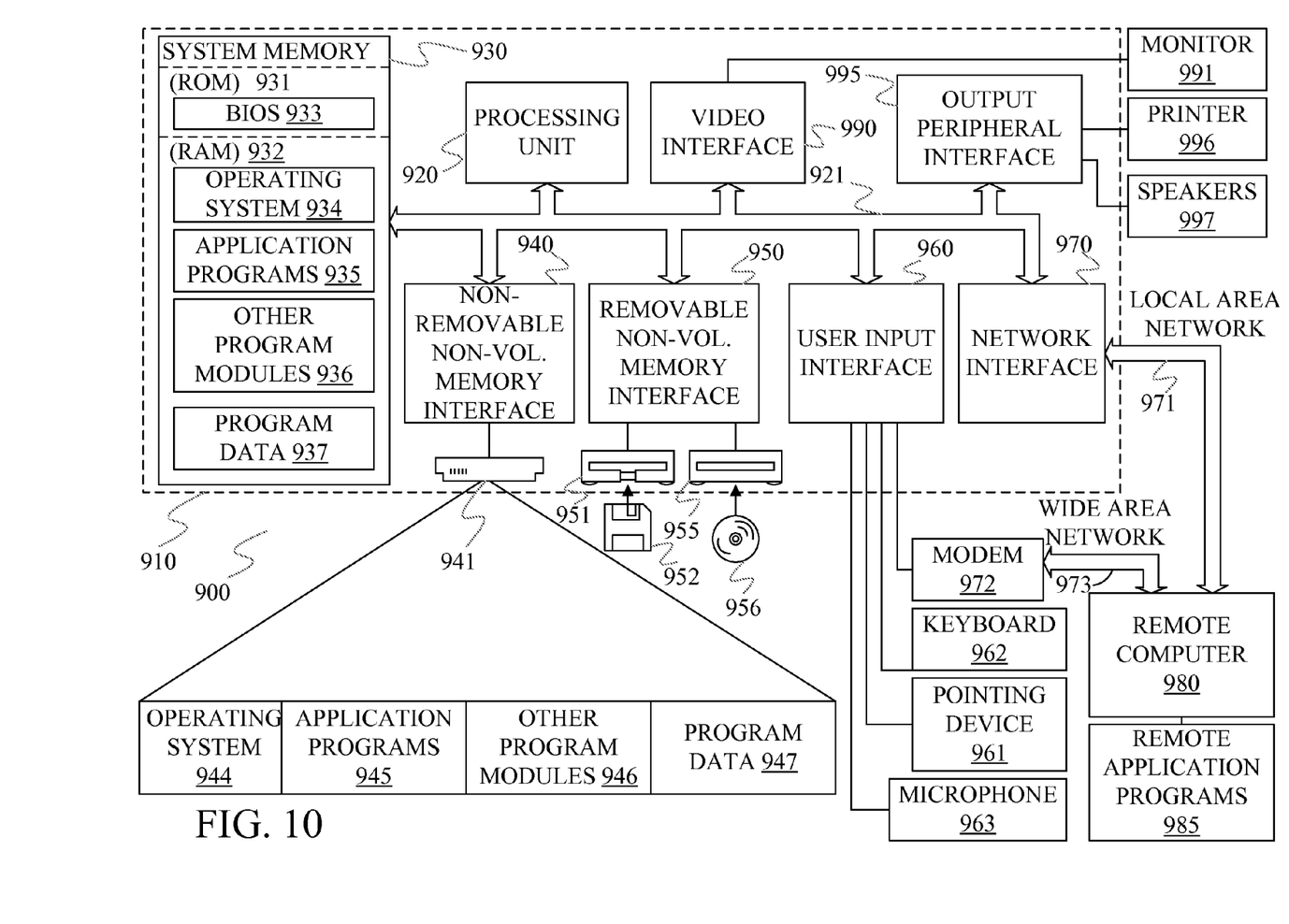
FIG. 10 is one illustrative embodiment of a computing environment that can be used to implement the systems shown in FIGS. 1-9.

FIG. 10 is one illustrative embodiment of a computing environment which can be used to implement the various functions or components shown in the previous figures. It will be noted, of course, that those components can be components that are stored on one of the various storage devices shown in FIG. 10, and which are used to activate processing unit 920. Similarly, of course, the components need not be stored in memory, but could be implemented on silicon, or otherwise. It will be noted, however, that the components shown in the present Figures are not implemented using a modulated signal or carrier wave.

With reference to FIG. 10, an exemplary system for implementing some embodiments includes a general-purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910 and does not include a modulated data signal or carrier wave. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. They can also include search components 902 and 904.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections to one or more remote computers, such as a remote computer 980. The remote computer 980 may be a personal computer, a hand-held device, a server, a router, a network PC, a peer device or other common network node, and typically includes many or all of the elements described above relative to the computer 910. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 371 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on remote computer 980. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of transforming data for evaluation of a function, using a computer with a processor, the method comprising:
   receiving, at the processor on a delegator, an input upon which the function is to be evaluated;
   selecting a first random message and a second random message;
   obtaining a first master public key and a second master public key;
   incorporating, with the processor at the delegator, the input into a request to perform a task that is transmitted to a server, by performing attribute-based encryption of both the first random message with the first master public key and the input as attributes, and the second random message with the second master public key and the input as attributes, to obtain a first ciphertext and a second ciphertext, the task being to decrypt one of the first and second ciphertexts and, when performed, provides a secondary result as one of the first and second random messages observable by the delegator, wherein the secondary result is different from an answer to which the server evaluates the function and is verified by the delegator with less computational expense than evaluation of the function on the input and wherein the task is only performed by the server after the server has verifiably evaluated the function based on the input;
   transmitting request data, indicative of the request with the input incorporated therein, to the server for performance of the task by the server;
   receiving, at the processor at the delegator, a returned result from the server indicative of the server performing the task, the returned result having a value that reflects both an answer to which the server has evaluated the function, and whether the answer is verified as being correct; and
   comparing the returned result to the first random message and to the second random message to determine both whether the server has verifiably evaluated the function based on the input, and the answer to which the server has evaluated the function based on the input, by determining whether the server has correctly decrypted the first ciphertext or the second ciphertext or neither the first nor the second ciphertext.

2. The computer-implemented method of claim 1 wherein the function comprises a Boolean function that evaluates to a first value or a second value based on a given input such that, in a given attribute-based encryption scheme, an access structure associated with the Boolean function comprises all inputs that evaluate to the first value under the Boolean function, and further comprising:
   generating a first master secret key and the first master public key for the attribute-based encryption scheme and a first secret key corresponding to the access structure associated with the Boolean function under the first master secret key and the first master public key.

3. The computer-implemented method of claim 2 and further comprising:
   transmitting the first master public key and the first secret key to the server.

4. The computer-implemented method of claim 3 wherein, if the server has correctly decrypted the first ciphertext, then determining that the Boolean function has been verifiably evaluated based on the input to the first value; and if the server has not correctly decrypted the first ciphertext, then determining that the Boolean function has been evaluated, based on the input, to the second value.

5. The computer-implemented method of claim 3 and further comprising:
generating a second master secret key and the second master public key for the attribute-based encryption scheme and a second secret key corresponding to an access structure associated with a complement of the Boolean function under the second master secret key and the second master public key.

6. The computer-implemented method of claim 5 and further comprising:
transmitting the second master public key and the second secret key to the server.

7. The computer-implemented method of claim 3 and further comprising:
if the server has correctly decrypted the first ciphertext, then determining that the Boolean function has been verifiably evaluated based on the input to the first value;
if the server has correctly decrypted the second ciphertext, then determining that the Boolean function has been verifiably evaluated based on the input to the second value; and
if the server has not correctly decrypted either the first ciphertext or the second ciphertext, then determining that the server has not verifiably evaluated the Boolean function based on the input.

8. The computer-implemented method of claim 1 and further comprising:
performing a task based on comparison of the returned result to the secondary result.

9. A computer-implemented method of transforming data for evaluation of a function, using a computer with a processor, the method comprising:
performing a preprocessing step with a processor on a delegator to obtain evaluation information used to evaluate the function and transmitting the evaluation information to a server that evaluates the function;
receiving, at the processor on the delegator, an input upon which the function is to be
performing attribute-based encryption of a first random message using a first master public key and the input as attributes to obtain a first ciphertext;
performing attribute-based encryption of a second random message using a second master public key and the input as attributes to obtain a second ciphertext,
transmitting the first and second ciphertexts and the first and second master public keys and first and second secret keys, to the server for decryption by the server;
receiving a returned result from the server indicative of the server attempting to decrypt the first or second ciphertext, the returned result, when decryption is successful, comprising one of the first random message and the second random message; and
comparing the returned result to the first random message and to the second random message to determine whether the server has correctly decrypted the first ciphertext or the second ciphertext or neither, to determine both whether the server has verifiably evaluated the function based on the input, and the answer to which the server has evaluated the function based on the input.

10. The computer-implemented method of claim 9 and further comprising:
performing a task based on the answer to which the server has evaluated the function.

11. The computer-implemented method of claim 9 wherein the function comprises a Boolean function that evaluates to a first value or a second value based on a given input such that, in a given attribute-based encryption scheme, a first access structure associated with the Boolean function comprises all inputs that evaluate to the first value under the Boolean function and a second access structure associated with a complement of the Boolean function comprises all inputs that evaluate to the second value under the Boolean function, and wherein performing the pre-processing step to obtain the evaluation information comprises:
generating a first master secret key and the first master public key for the attribute-based encryption scheme and the first secret key corresponding to the first access structure associated with the Boolean function under the first master secret key and the first master public key; and
generating a second master secret key and the second master public key for the attribute-based encryption scheme and the second secret key corresponding to the second access structure associated with the complement of the Boolean function under the second master secret key and the second master public key.

12. The computer-implemented method of claim 11 and further comprising:
if the server has correctly decrypted the first ciphertext, then determining that the Boolean function has been verifiably evaluated based on the input to the first value;
if the server has correctly decrypted the second ciphertext, then determining that the Boolean function has been verifiably evaluated based on the input to the second value; and
if the server has not correctly decrypted either the first ciphertext or the second ciphertext, then determining that the server has not verifiably evaluated the Boolean function based on the input.

13. A computer-implemented method of transforming data for evaluation of a function, using a computer with a processor, the method comprising:
performing a preprocessing step with a processor on a delegator to obtain evaluation information used to evaluate the function wherein the function comprises a Boolean function that evaluates to a first value or a second value based on a given input such that, in a given attribute-based encryption scheme, a first access structure associated with the Boolean function comprises all inputs that evaluate to the first value under the Boolean function and a second access structure associated with a complement of the Boolean function comprises all inputs that evaluate to the second value under the Boolean function, wherein performing the pre-processing step to obtain the evaluation information comprises:
generating a first master secret key and a first master public key for the attribute-based encryption scheme and a first secret key corresponding to the first access structure associated with the Boolean function under the first master secret key and the first master public key;
generating a second master secret key and a second master public key for the attribute-based encryption scheme and a second secret key corresponding to the second access structure associated with the complement of the Boolean function under the second master secret key and the second master public key; and
transmitting the first and second master public keys and the first and second secret keys to the server;
receiving, at the processor on the delegator, an input upon which the Boolean function is to be evaluated;

selecting a first random message and a second random message;

performing attribute-based encryption of the first random message using the first master public key and the input as attributes to obtain a first ciphertext;

performing attribute-based encryption of the second random message, using the second master public key and the input as attributes to obtain a second ciphertext;

receiving a returned result from the server indicative of the server attempting to decrypt the first or second ciphertext, the returned result comprising one of the first random message and the second random message;

comparing the returned result to the first random message and to the second random message to determine whether the server has correctly decrypted the first ciphertext or the second ciphertext, or neither the first ciphertext nor the second ciphertext;

if the server has correctly decrypted the first ciphertext, then determining that the Boolean function has been verifiably evaluated based on the input to the first value;

if the server has correctly decrypted the second ciphertext, then determining that the Boolean function has been verifiably evaluated based on the input to the second value; and if the server has not correctly decrypted either the first ciphertext or the second ciphertext, then determining that the server has not verifiably evaluated the Boolean function based on the input.

\* \* \* \* \*